US011415595B2

(12) United States Patent
Vohra et al.

(10) Patent No.: US 11,415,595 B2
(45) Date of Patent: Aug. 16, 2022

(54) MULTIPLE ANCHOR HIGH FREQUENCY ACCELEROMETER

(71) Applicant: Analog Devices, Inc., Norwood, MA (US)

(72) Inventors: Gaurav Vohra, Sudbury, MA (US); Xin Zhang, Acton, MA (US); Michael Judy, Ipswich, MA (US)

(73) Assignee: Analog Devices, Inc., Wilmington, MA (US)

( * ) Notice: Subject to any disclaimer, the term of this patent is extended or adjusted under 35 U.S.C. 154(b) by 21 days.

(21) Appl. No.: 16/457,849

(22) Filed: Jun. 28, 2019

(65) Prior Publication Data

US 2020/0408801 A1   Dec. 31, 2020

(51) Int. Cl.
*G01P 15/08* (2006.01)
*G01P 15/125* (2006.01)

(52) U.S. Cl.
CPC .... *G01P 15/125* (2013.01); *G01P 2015/0831* (2013.01); *G01P 2015/0862* (2013.01)

(58) Field of Classification Search
CPC .................................................... G01P 15/125
USPC ..................................................... 73/504.14
See application file for complete search history.

(56) References Cited

U.S. PATENT DOCUMENTS

| 8,020,443 B2 | 9/2011 | Lin et al. |
| 9,176,157 B2 | 11/2015 | Simoni et al. |
| 9,246,017 B2 | 1/2016 | van der Heide et al. |
| 9,606,191 B2 | 3/2017 | Seeger et al. |
| 9,663,348 B1 | 5/2017 | Geisberger |
| 10,139,427 B2 * | 11/2018 | Tanaka ................... B81B 3/0021 |
| 2013/0104651 A1 * | 5/2013 | Li ....................... G01C 19/5762 73/504.12 |
| 2013/0214367 A1 | 8/2013 | van der Heide et al. |
| 2016/0097791 A1 | 4/2016 | Zhang |
| 2016/0097792 A1 | 4/2016 | Naumann |
| 2017/0356929 A1 | 12/2017 | Zheng |

(Continued)

FOREIGN PATENT DOCUMENTS

| EP | 2 175 280 A1 | 4/2010 |
| WO | WO 2018/026677 A1 | 2/2018 |

OTHER PUBLICATIONS

International Search Report and Written Opinion dated Oct. 27, 2020 in connection with International Application No. PCT/US2020/039799.

*Primary Examiner* — Walter L Lindsay, Jr.
*Assistant Examiner* — Philipmarcus T Fadul
(74) *Attorney, Agent, or Firm* — Wolf, Greenfield & Sacks, P.C.

(57) ABSTRACT

Single-axis teeter-totter accelerometers having a plurality of anchors are disclosed. The plurality of anchors may be arranged about a rotation axis of the teeter-totter proof mass. Each of the plurality of anchors may be coupled to the proof mass by two torsional springs each extending along the rotation axis. The plurality of anchors allows an increased number of torsional springs to be coupled to the proof mass and thus greater torsional stiffness for the proof mass may be achieved. Due to the higher torsional stiffness, the disclosed single-axis teeter-totter accelerometers may be deployed in high-frequency environments where such increased torsional stiffness is required, for example, around 20 kHz and above.

20 Claims, 6 Drawing Sheets

(56) References Cited

U.S. PATENT DOCUMENTS

2018/0231580 A1  8/2018  Clark
2020/0018777 A1* 1/2020  Liukku ................ G01P 15/125

* cited by examiner

MULTIPLE ANCHOR HIGH FREQUENCY ACCELEROMETER

FIELD OF THE DISCLOSURE

The present application relates to microelectromechanical systems (MEMS) single-axis accelerometers.

BACKGROUND

A single-axis accelerometer such as a may include a "teeter-totter" proof mass which pivots about a rotation axis in response to acceleration along the single axis. Accelerometers may operate over a wide range of frequencies.

SUMMARY OF THE DISCLOSURE

Single-axis teeter-totter accelerometers having a plurality of anchors are disclosed. The plurality of anchors may be arranged about a rotation axis of the teeter-totter proof mass. Each of the plurality of anchors may be coupled to the proof mass by two torsional springs each extending along the rotation axis. The plurality of anchors allows an increased number of torsional springs to be coupled to the proof mass and thus greater torsional stiffness for the proof mass may be achieved. Due to the higher torsional stiffness, the disclosed single-axis teeter-totter accelerometers may be deployed in high-frequency environments where such increased torsional stiffness is required, for example, around 20 kHz and above.

According to aspects of the present application, there is provided a single-axis teeter-totter MEMS accelerometer comprising a substrate, a proof mass suspended above the substrate, and a plurality of anchors arranged in-line with each other parallel to a rotation axis of the proof mass and coupling the proof mass to the substrate. Each of at least two anchors of the plurality of anchors is coupled to an interior edge of the proof mass by two respective, in-line torsional springs.

According to aspects of the present application, there is provided a single-axis teeter-totter MEMS accelerometer, comprising a substrate, a proof mass suspended above the substrate, a plurality of anchors coupling the proof mass to the substrate, and at least three torsional springs coupling the plurality of anchors to the proof mass. The plurality of anchors and the at least three torsional springs are arranged in a row along a rotation axis of the proof mass.

According to aspects of the present application, there is provided a single-axis teeter-totter MEMS accelerometer, comprising a substrate, a proof mass suspended above the substrate, and a plurality of anchors arranged along a rotation axis of the proof mass, disposed within a perimeter of the proof mass, and coupling the proof mass to the substrate, the plurality of anchors comprising a first anchor and a second anchor. The single-axis teeter-totter MEMS accelerometer comprises a first torsional spring extending along the rotation axis and coupling the proof mass to the first anchor, the first torsional spring being arranged on a first side of the first anchor, a second torsional spring extending along the rotation axis and coupling the proof mass to the first anchor, the second torsional spring being arranged on a second side of the first anchor different than the first side of the first anchor, a third torsional spring extending along the rotation axis and coupling the proof mass to the second anchor, the third torsional spring being arranged on a first side of the second anchor, and a fourth torsional spring extending along the rotation axis and coupling the proof mass to the second anchor, the fourth torsional spring being arranged on a second side of the second anchor different than the first side of the second anchor.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1A:
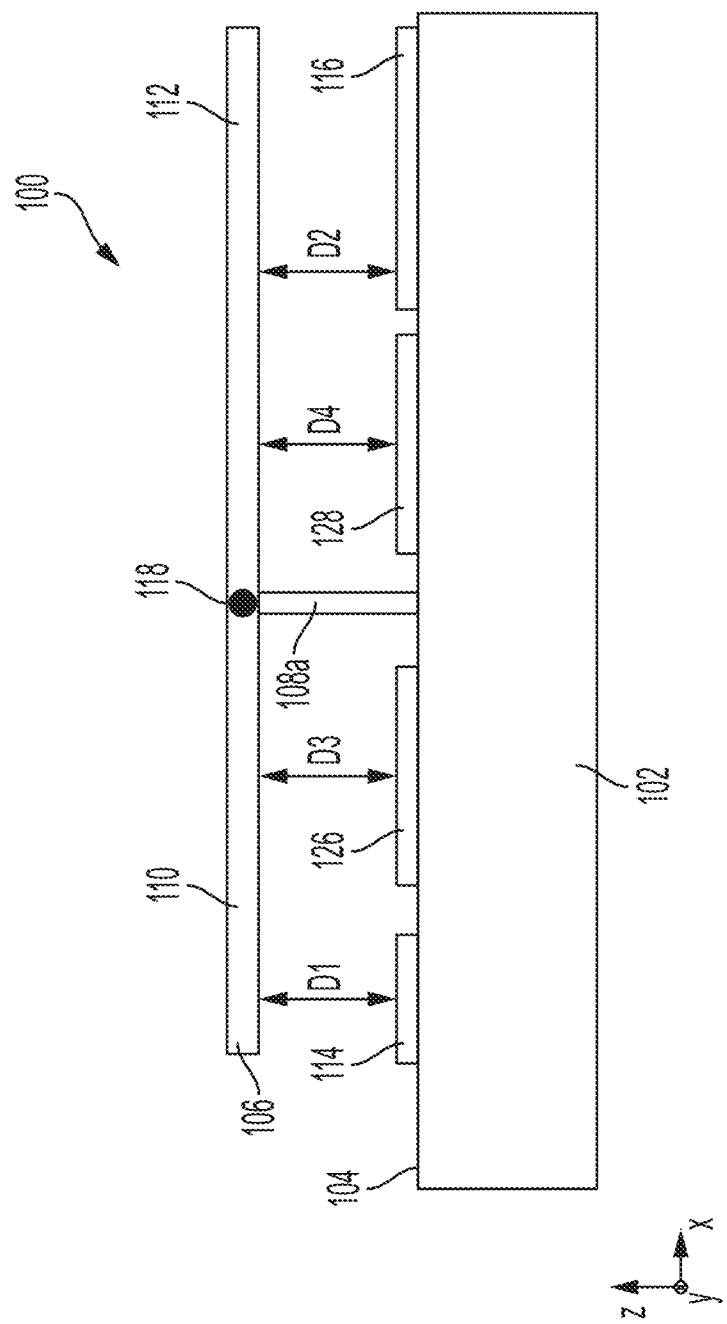
FIG. 1A is a side view of a single-axis accelerometer having at least two anchors, according to a non-limiting embodiment of the present application.

Aspects of the present application relate to a microelectromechanical systems (MEMS) single-axis accelerometer having a proof mass or beam configured to pivot about a rotation axis. In various embodiments, a plurality of anchors are coupled to an interior edge of the proof mass, are disposed within perimeter of the proof mass, and/or are embedded within the proof mass. Anchors may be arranged on or offset from the rotation axis. In some embodiments, each of the anchors is coupled to the proof mass by at least two torsional springs. Each of the two torsional springs may be arranged extending along the rotation axis, and may be arranged on or offset from the axis. The overall stiffness of single-axis accelerometers having a plurality of anchors along the rotation axis disclosed herein may be greater than the overall stiffness of conventional single-axis accelerometers, particularly at higher frequencies, such as greater than about 20 kHz. In various embodiments, a target operating frequency of for the increased stiffness accelerometer may be include ranges greater than about 10 kHz, greater than about 15 KHz, greater than about 20 kHz, greater than about 30 kHz, greater than about 39 kHz, or greater than about 43 kHz, although other frequency ranges are possible and the various aspects described herein are not limited to these particular frequencies.

The inventors recognized that an accelerometer comprising an increased number of anchors, for example, at least two anchors, may be suitable for higher target frequency environments. The inventors have recognized that at higher frequencies, a larger overall stiffness of the pivoting proof mass of an accelerometer may be required so that contact of the proof mass with the substrate and other high-frequency effects are avoided. High frequency devices may also enable applications for Condition Based Monitoring, a methodology for assessing the prognosis of run time to failure using vibration measurement. Early failure prediction of machines and equipment may be important to predict possible future downtime, improve system reliability, decrease maintenance costs (which may be in the range of millions of dollars for large companies) and decrease the number of maintenance operations.

In conventional accelerometers, when an increased torsional stiffness is required, the cross-sectional area of the torsional springs of the accelerometer is increased, and the length of the torsional springs of the accelerometer is decreased to achieve the increased stiffness. However, the inventors have recognized that as cross-section is increased and length is decreased, for torsional springs to continue to operate as springs as opposed to rigid bars, there is a maximum functional cross-section and a minimum functional length for the springs. At a certain point, the cross-section can no longer be increased and the length can no longer be decreased, and the maximum stiffness for the spring is achieved. Further, these conventional high cross-section low length springs are rigid and prone to breaking.

The inventors have recognized that the conventional configuration of a single anchor and two springs cannot provide adequate stiffness for certain frequencies and environments. By using a configuration of at least two anchors, each anchor can be arranged have two torsional springs. The additional springs may be considered to be arranged in parallel and increase the overall stiffness of the accelerometer. Accordingly, by increasing the number of anchors and therefore also increasing the number of springs in the accelerometer, simultaneously increasing the overall stiffness of the accelerometer, the accelerometer may be more suitable for high target operating frequency environments.

The aspects and embodiments described above, as well as additional aspects and embodiments, are described further below. These aspects and/or embodiments may be used individually, all together, or in any combination of two or more, as the application is not limited in this respect.

FIG. 1A shows a side view of single-axis accelerometer 100, according to one exemplary embodiment of the present application. Single-axis accelerometer 100 is arranged on substrate 102 having an upper surface 104, and includes proof mass 106, at least a first anchor 108a, first proof mass portion 110, second proof mass portion 112, first electrode 114, second electrode 116, third electrode 126, and fourth electrode 128. The proof mass 106 is configured to pivot about rotation axis 118 and may be coupled to the anchor by at least one torsional spring (not depicted). Distance D1 indicates a distance between first proof mass portion 110 and first electrode 114, distance D2 indicates a distance between the second proof mass portion 112 and second electrode 116, distance D3 indicates a distance between the first proof mass portion 110 and third electrode 126, and distance D4 indicates a distance between the second proof mass portion 112 and fourth electrode 128.

In some embodiments, a single-axis accelerometer is configured to sense acceleration in the z direction. For example, in FIG. 1A, single-axis accelerometer 100 is configured to sense acceleration in the z direction. Accordingly, the single-axis accelerometer 100 may also be referred to as a z-axis accelerometer.

In some embodiments, the proof mass is suspended above the substrate 102. The proof mass 106 may be configured to move relative to the substrate 102 in response to an acceleration along the single axis, in this example, the z direction. In some embodiments, the proof mass 106 pivots about rotation axis 118 in response to the acceleration to be measured. In the illustrative embodiment of FIG. 1A, the rotation axis 118 is arranged substantially in the x-y plane. Typically, the x-y plane is formed by the upper surface 104 of the substrate 102. Accordingly, the rotation axis 118 may be arranged substantially parallel to the upper surface 104 of the substrate 102. Other arrangements are possible depending on the definition of the coordinate system and the direction of acceleration to be sensed.

According to aspects of the present application, the proof mass 106 pivots in response to acceleration along the single axis due to a mass imbalance of the proof mass 106. In at least one aspect, the proof mass 106 may be asymmetric relative to the rotation axis 118. For example, proof mass 106 may be arranged in, or comprise, one or more portions that may have different masses. In some embodiments, the proof mass 106 includes a first proof mass portion 110, and a second poof mass portion 112. In FIG. 1A, the first proof mass portion 110 is arranged on one side of the rotation axis 118 and the second proof mass portion is arranged on an opposite side of the rotation axis 118.

In some embodiments, the proof mass 106 is arranged such that there is a mass imbalance across the rotation axis 118. In the illustrative embodiment of FIG. 1A, the second proof mass portion 112 has a greater mass than the first proof mass portion 110. In various other embodiments, the proof mass 106 is asymmetric with respect to shape in the x-y plane and/or asymmetric with respect to mass distribution. In various embodiments, the proof mass 106 further includes openings or other structures arranged to distribute the mass of the proof mass 106. As such, the mass of the first proof mass portion 110, and the mass of the second proof mass portion 112 are configured such that proof mass 106 pivots in response to an acceleration in the z direction.

In some embodiments, an asymmetric proof mass may comprise a non-rectangular shape. While the proof mass 106 illustrated in FIG. 1B may be considered to be arranged as a rectangular shape having a mass imbalance due to an offset of the rotation axis, other arrangements are possible. A proof mass may have a mass imbalance due to asymmetric shape. For example, a proof mass may be arranged in an "L" shape. An "L" shape proof mass may have a mass imbalance due to the shape of the proof mass. For example, a portion of the proof mass may have the shape of an "L," and therefore even if the rotation axis is centered with respect to the ends of the "L" shaped proof mass, the "L" shaped proof mass has a mass imbalance because one side of the proof mass includes an extra portion. Even so, a proof mass of an "L" shape or any other shape may still have an offset rotation axis. In some embodiments, there may be provided at least one accelerometer comprising two "L" shaped proof masses. The two "L" shaped proof masses may be arranged with their portions having the shape of an "L" opposite to each other. In this case, the two opposite "L" shaped proof masses may form a pair providing a fully differential accelerometer, as one example.

The extra portion of an "L" shaped proof mass may have various arrangements relative to the rotation axis of the proof mass. In some embodiments, the extra portion of an "L" shaped proof mass protrudes from a main portion of the proof mass in a direction parallel to a rotation axis of the proof mass. Alternatively, an extra portion may protrude from the main portion in a direction perpendicular to the rotation axis. The main portion may be rectangular and may be reflection symmetric across the rotation axis. The main portion may enclose all of the anchors of the proof mass.

In some embodiments, the single-axis accelerometer includes sensing and driving structures. In the illustrative embodiment of FIG. 1A, the accelerometer includes a first electrode 114, a second electrode 116, a third electrode 126, and a fourth electrode 128. Third electrode 126 is arranged between the first anchor 108a and the first electrode 114. Fourth electrode 128 is arranged between the first anchor 108a and the second electrode 116. The third electrode 126 and the fourth electrode 128 may be used to create the imbalance in force to at least in part cause the beam pivot.

In the illustrative embodiment of FIG. 1A, each electrode is coupled to a portion of the proof mass 106. For example, first electrode 114 is arranged at a variable distance of D1 from the first proof mass portion 110, the second electrode 116 is arranged at a variable distance D2 from the second proof mass portion 112, third electrode 126 is arranged at a variable distance of D3 from the first proof mass portion 110, and fourth electrode 128 is arranged at a variable distance of D4 from the second proof mass portion 112. In some embodiments, when the proof mass is at rest, distances D1, D2, D3 and D4 are the same, but in other embodiments, they may be different. However, the present application is not limited in this respect, and electrodes may be configured in other arrangements, for example, on the proof mass 106, or arranged on different substrate.

The third electrode 126 and the fourth electrode 128 may comprise sense and/or drive electrodes. In some embodiments, third electrode 126 and fourth electrode 128 provide drive functionalities. Third electrode 126 and fourth electrode 128 may provide a driving signal to the proof mass 106. In some embodiments, a driving signal comprises an alternating current signal and is applied by each the third and fourth electrodes to the proof mass 106.

In some embodiments, third electrode 126 and fourth electrode 128 provide sense functionalities. For example, the third electrode 126 and the fourth electrode 128 may be configured to provide a sense signal derived from the displacement of the proof mass 106 relative to the substrate. In some embodiments, the third electrode 126 and the fourth electrode 128 are configured to provide a sensing signal indicating at least one of the distances D3 and D4.

The single-axis accelerometer 100 may form at least one sense capacitor. In the illustrative embodiment of FIG. 1A, the third electrode 126 faces the first proof mass portion 110 and forms a first sense capacitor. The fourth electrode 128 faces the second proof mass portion 112 and forms a second sense capacitor. Portions of the proof mass may be configured such that they include a substantially equal sensing area facing the electrodes.

The capacitance of sense capacitors may be used to measure an acceleration of the single-axis accelerometer 100 as the proof mass 106 pivots about the rotation axis. The capacitance of the first sense capacitor may vary as the distance D3 between the first proof mass portion 110 of the pivoting proof mass 106 and the third electrode 126 disposed on substrate 102 varies. The capacitance of the second sense capacitor may vary as the distance D4 between the second proof mass portion 112 of the pivoting proof mass 106 and the fourth electrode 128 disposed on substrate 102 varies. A signal derived from the displacement of the proof mass 106 may be used to find the acceleration of the accelerometer along the single axis.

In some embodiments, the sense capacitors provide an output signal that indicates a change in capacitance due to pivoting of the proof mass 106. In some embodiments, the output signal may be used to determine an acceleration of the single-axis accelerometer 100. The first and second sense capacitors may provide a differential signal. Thus, the third electrode 126 and the fourth electrode 128 may be referred to as differential electrodes. The first sense capacitor may provide a first capacitance and the second sense capacitor may provide a second capacitance. The first capacitance and the second capacitance may provide, and/or may be compared to provide, a differential or pseudo-differential signal. That is to say, as one capacitance increases, the other capacitance may decrease.

The differential output signal may be obtained from components of the single-axis accelerometer 100. In some embodiments, signals may be obtained from the third electrode 126 and the fourth electrode 128. In some embodiments, the proof mass 106 forms an electrode that includes the first proof mass portion 110 facing the third electrode 126 and the second proof mass portion 112 facing the fourth electrode 128. The first anchor 108a may be electrically coupled to the proof mass. The first anchor 108a may in turn be electrically coupled to a conductive trace or other structure disposed on the substrate 102. Thus, the first anchor 108a may provide an output signal from the proof mass 106 to the trace. The first anchor 108a may be disposed between the first poof mass portion 110 which forms part of the first sense capacitor and the second proof mass portion 112 which forms part of the second sense capacitor, along a direction perpendicular to the rotation axis 118, in FIG. 1A, the x direction. The first anchor 108a may therefore provide a differential signal indicative of a comparison of signals are respectively provided by the first and second sense capacitors.

The signal may be provided to a device disposed on the substrate or a device external to the substrate. The device may include circuitry configured to process the output signal to determine an acceleration. For example, the device may perform at least one operation on the signal to calculate an acceleration applied to the accelerometer along the single axis. For example, a suitable algorithm may be employed in logic or a processor to calculate an acceleration.

The substrate 102 has an upper surface 104. The upper surface 104 may be substantially planar. The upper surface 104 of the substrate 102 is arranged between the substrate 102 and other components of the single-axis accelerometer 100 illustrated in FIG. 1A.

According to aspects of the present application, a substrate, such as substrate 102, may comprise various materials. In some embodiments, a substrate may comprise a semiconductor material. For example, a substrate may comprise a bulk or monocrystalline semiconductor substrate, such as a bulk or monocrystalline silicon substrate. In some embodiments, a substrate may comprise a deposited semiconductor substrate, such as polycrystalline silicon. In some embodiments, a substrate may comprise a silicon-on-insulator substrate or may comprise a buried oxide layer. Other semiconductor materials may be used as substrates. In some embodiments, a substrate, such as substrate 102, may comprise a printed circuit board (PCB), or a semiconductor material substrate may be mounted to a PCB.

In some embodiments, the single-axis accelerometer 100 is a MEMS device. Accordingly, single-axis accelerometer 100 may be formed using various MEMS fabrication techniques. Furthermore, in some embodiments, the substrate 102, the proof mass 106, the first anchor 108a, first electrode 112, second electrode 114, third electrode 126, and fourth electrode 128, any torsional springs, and further components such as any components not depicted in FIG. 1A may be formed of a conductor and/or semiconductor material, such as polysilicon, silicon, or a metal conductor. If a semiconductor material is used, the material may be suitably doped to exhibit a desired conductivity. The components may be formed via any suitable fabrication process.

Figure 1B:
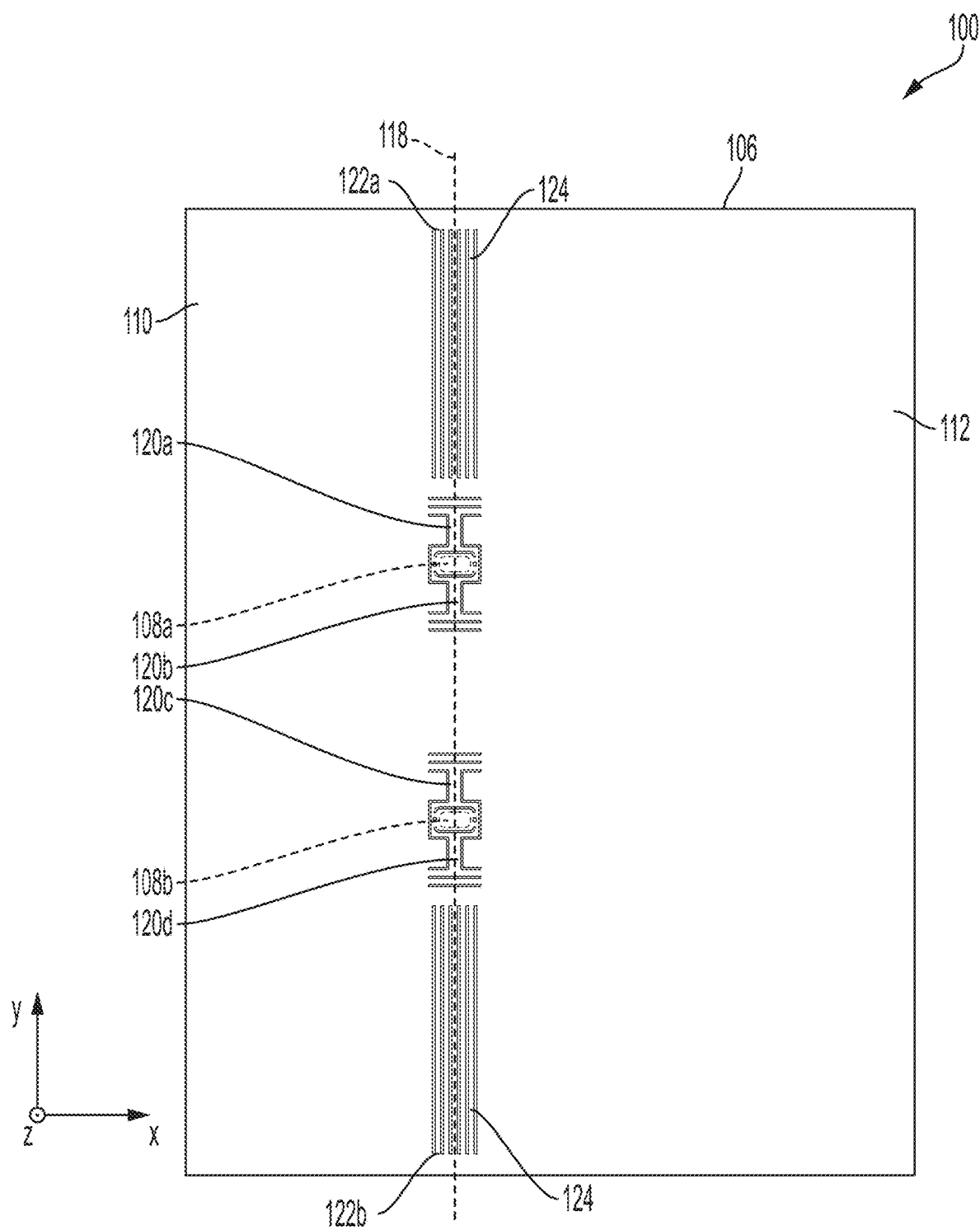
FIG. 1B is a top plan view of the single-axis accelerometer of FIG. 1A, according to the non-limiting embodiment.

FIG. 1B shows a top plan view of the single-axis accelerometer 100, according to the exemplary embodiment. FIG. 1B depicts elements of single-axis accelerometer 100 including proof mass 106, first anchor 108a, second anchor 108b, first proof mass portion 110, second proof mass portion 112, first torsional spring 120a, second torsional spring 120b, third torsional spring 120c, fourth torsional spring 120d, first stress-relief structure 122a, second stress-relief structure 122b, and a plurality of high aspect ratio beams 124. The proof mass 106 is configured to pivot about rotation axis 118, and may be arranged on the upper surface of a substrate (not depicted) that includes sense and/or drive electrodes (not depicted).

Proof mass 106 may be configured to accommodate at least two anchors. In some embodiments, the anchors are disposed within an outer perimeter of the proof mass 106 in the x-y plane. The at least two anchors may also be arranged embedded within the proof mass 106. For example, the proof mass 106 may have a shape formed around the anchors such that the proof mass and the anchors do not overlap in the x-y plane. In some embodiments, the proof mass is coupled to the anchors at an interior edge of the proof mass.

In some embodiments, a single-axis accelerometer comprises at least two anchors. For example, FIG. 1B depicts a single-axis accelerometer 100 have two anchors, a first anchor 108a and a second anchor 108b. However, in various embodiments, a single-axis accelerometer may be configured with a different number of anchors, for example, one anchor, two anchors, three anchors, four anchors, five anchors, at least one anchor, at least two anchors, at least three anchors, at least four anchors, at least five anchors, an even number of anchors, or an odd number of anchors.

The increased number of at least two anchors of single-axis accelerometer 100 compared to a conventional single anchor accelerometer allows an increased number of torsional springs. Accordingly, an increased overall torsional stiffness may be achieved relative to a single anchor accelerometer. Similarly, the torsional stiffness may be increased beyond the previously-described limits of torsional stiffness caused by cross-sectional and length constraints of the torsional springs.

Anchors may be disposed in various arrangements relative to rotation axes. A plurality of anchors may be arranged in a row along the rotation axis of the proof mass. Within a row, there may be some offsets from the rotation axis. In some embodiments there may be a plurality of rows of anchors, for example, two rows of anchors. When anchors are arranged in a plurality of rows, there may be two or more anchors arranged at the same coordinate along the rotation axis offset from each other in a direction perpendicular to the rotation axis.

In some embodiments, anchors may be arranged along the rotation axis. Anchors may be arranged collinear or in-line, for example, along the axis. Collinear anchors can be less sensitive to environmental stresses and/or shears. In some embodiments, anchors are arranged being symmetric in at least one way. In some embodiments, anchors are arranged reflection symmetric across the rotation axis. Anchors may be arranged reflection symmetric across an axis bisecting the proof mass in a direction perpendicular to the rotation axis. In some embodiments, a bisecting axis may bisect a proof mass by equal distance to two opposite outer edges, along the rotation axis. In some embodiments, a bisecting axis may bisect a proof mass by equal mass on either side of the bisecting line. Alternatively or additionally, a bisecting axis may be equidistant from two outermost anchors of a proof mass, irrespective of the arrangement of outer edges or mass. In some embodiments, anchors are arranged rotation symmetric about a point at the intersection of the rotation axis an the axis bisecting the proof mass in a direction perpendicular to the rotation axis. For example, the anchors may be 180 degree rotation symmetric about this point.

In some embodiments, an anchor may be arranged on an rotation axis. An anchor arranged on a rotation axis may be coincident with that rotation axis, and/or may be arranged overlapping the rotation axis in the x-y plane for a z-axis accelerometer.

In some embodiments, an anchor may be offset from the rotation axis. For example, an anchor may be offset from the rotation axis along a direction perpendicular to the rotation axis, in the plane of the upper surface of the substrate. An anchor arranged offset from a rotation axis may be non-coincident with that rotation axis and/or may be arranged not overlapping with the rotation axis in the x-y plane for a z-axis accelerometer.

Anchors of a plurality of anchors may be arranged at various distances from each other. For example, each anchor may be arranged with a same center-to-center distance along the rotation axis. In some embodiments, the center-to-center distance of the anchors is less than a distance from the center of the outermost anchors to the perimeter of the proof mass along the rotation axis. However, other arrangements are possible, and the center-to-center distances may vary, as well as the distances to the perimeter of the proof mass.

In the illustrative embodiment of FIG. 1B, first anchor 108a and second anchor 108b are arranged collinear with each other and on the rotation axis 118. In FIG. 1B, the first anchor 108a and the second anchor 108b are together arranged reflection symmetric across the rotation axis, reflection symmetric across an axis bisecting the proof mass in a direction perpendicular to the rotation axis, and 180 degree rotation symmetric about the point at the intersection of the rotation axis and the axis bisecting the proof mass in a direction perpendicular to the rotation axis. In FIG. 1B, the bisecting axis bisects proof mass 106 by equal distance to the two opposite outer edges, along the rotation axis as well as by equal mass on either side of the bisecting line, and is also equidistant from the outermost anchors of the proof mass 106.

In some embodiments, each anchor is coupled to the proof mass 106 by at least one torsional spring. For example, in the illustrative embodiment of FIG. 1B, the first anchor 108a and the second anchor 108b are each coupled to the proof mass by two respective torsional springs. Other arrangements are possible, and each anchor may also be coupled to the proof mass 106 by at least two torsional springs, for example, three or four torsional springs.

In some embodiments, each spring of the plurality of springs is arranged extending along the rotation axis 118. For example, in FIG. 1B, each of first torsional spring 120a, second torsional spring 120b, third torsional spring 120c, and third torsional spring 120d includes at least one segment which is arranged extending along the rotation axis 118. A torsional spring may be a spring which is configured to allow relative rotational movement about a rotation axis between elements coupled to the ends of the torsional spring, in response to an applied moment about the rotation axis and/or may be substantially rigid to rotation about other axes or to other types of motion. Generally, torsional springs in accelerometers have a particular designed torsional stiffness. Torsional stiffness may be dependent on material properties of the torsional spring, the cross section of the torsional spring, and the length of the torsional spring, among other factors.

Torsional springs may be disposed in various arrangements relative to rotation axes. A plurality of torsional springs may be arranged in a row along the rotation axis of the proof mass. Within a row, there may be some offsets from the rotation axis. In some embodiments there may be a plurality of rows of torsional springs, for example, two rows of torsional springs.

In some embodiments, torsional springs may be arranged along the rotation axis. Torsional springs may be arranged collinear or in-line, for example, along the axis. In some embodiments, torsional springs are arranged being symmetric in at least one way. In some embodiments, torsional springs are arranged reflection symmetric across the rotation axis. Torsional springs may be arranged reflection symmetric across an axis bisecting the proof mass in a direction perpendicular to the rotation axis. In some embodiments, torsional springs are arranged rotation symmetric about a point at the intersection of the rotation axis an the axis bisecting the proof mass in a direction perpendicular to the rotation axis. For example, the torsional springs may be 180 degree rotation symmetric about this point. Symmetric springs may spread shock stresses symmetrically to springs.

In some embodiments, a torsional spring includes a torsional spring segment that extends along a rotation axis and may be arranged substantially parallel to that rotation axis. At least one torsional spring segment of a torsional spring may be straight and may be configured to twist about its own elongated axis, which may be aligned with the rotation axis. A torsional spring may be considered a straight torsional spring when it includes at least one straight torsional spring segment configured to twist about its elongated axis, particularly when the straight segment comprises the substantial portion of the torsional spring. In some embodiments, a torsional spring segment which extends along an axis may be configured to allow relative rotational movement, along that axis, between the ends of the torsional spring, in response to an applied moment about the axis.

The torsional springs may include other types of torsional springs. In some embodiments, a torsional spring may include a folded spring configured to allow rotation about a rotation axis. A torsional spring may also comprise a serpentine structure and/or may comprise at least one element having an "S" shape.

In some embodiments, at least one torsional spring segment of a torsional spring that extends along a rotation axis may be arranged on that rotation axis. A torsional spring segment arranged on a rotation axis may be coincident with that rotation axis, and/or may be arranged overlapping the rotation axis in the x-y plane for a z-axis accelerometer. A torsional spring containing this torsional spring segment may be considered to be arranged on the axis.

In some embodiments, a torsional spring includes a torsional spring segment that extends along a rotation axis and may be offset from that rotation axis. For example, a torsional spring may be offset from the rotation axis along a direction perpendicular to the rotation axis, in the plane of the upper surface of the substrate. A torsional spring segment arranged offset from a rotation axis may be non-coincident with that rotation axis and/or may be arranged not overlapping with the rotation axis in the x-y plane for a z-axis accelerometer. A torsional spring containing this torsional spring segment may be considered to be arranged offset the axis.

In the illustrative embodiment of FIG. 1B, first torsional spring 120a, second torsional spring 120b, third torsional spring 120c, and fourth torsional spring 120d are arranged collinear with each other and on the rotation axis. In FIG. 1B, first torsional spring 120a, second torsional spring 120b, third torsional spring 120c, and fourth torsional spring 120d are together arranged reflection symmetric across the rotation axis, reflection symmetric across an axis bisecting the proof mass in a direction perpendicular to the rotation axis, and 180 degree rotation symmetric about the point at the intersection of the rotation axis an the axis bisecting the proof mass in a direction perpendicular to the rotation axis.

In some embodiments, a single-axis accelerometer may include at least one stress-relief structure. For example, in FIG. 1B, proof mass 106 includes first stress relief structure 122a and second stress relief structure 122b, each comprising a plurality of high-aspect ratio beams 124. Each stress relief structure may be configured to relieve stress in the proof mass 106 that occurs due to the twisting or bending of the torsional springs when the proof mass 106 bends, rotates, or twists. Stress-relief structures may be formed by etching a proof mass. Stress-relief structures, including the high aspect ratio beams, may extend all of or only part of the way though the proof mass in which they are formed.

Stress relief structures may be arranged in various configurations relative to anchors and torsional springs. In some embodiments stress-relief structures are arranged adjacent along the rotational axis to the outermost torsional springs. The stress-relief structures may be arranged between an outermost anchor and/or and outermost torsional spring and the perimeter of the proof mass. In some embodiments, the plurality of anchor and/or the plurality of torsional springs are arranged between a first stress-relief structure and a second stress-relief structure.

Stress relief structures may extend in various distances in a direction perpendicular to the rotation axis. For example, in FIG. 1B, the first stress-relief structure 122a and the second stress-relief structure 122b extend along the x direction to substantially the same distance from the rotation axis 118 as the plurality of anchors and the plurality of torsional springs. However, the stress-relief structures may also extend past or not as far as the plurality of anchors and/or the torsional springs extend. When anchors and/or torsional springs are arranged in multiple rows, each row may have an individual corresponding pair of stress-relief structures, or there may be a single pair of stress-relief structures extending to substantially the same distance from the rotation axis of the outermost rows.

In some embodiments, each of the stress-relief structures may comprise a plurality of high aspect ratio beams. In the illustrative embodiment of FIG. 1B, the first stress-relief structure 122a and the second stress-relief structure 122b each comprise a plurality of high aspect ratio beams 124 arranged extending along the rotation axis 112. The high aspect ratio beams 124 may have a smaller cross section than the torsional springs, and a greater length than the torsional springs. Accordingly, the individual high aspect ratio beams 124 may have a lower torsional stiffness than the torsional spring. The length of the high aspect ratio beams 124 may be increased as the number of anchors and torsional springs is decreased and may be decreased as the number of anchors and torsional springs is increased.

Figure 1C:
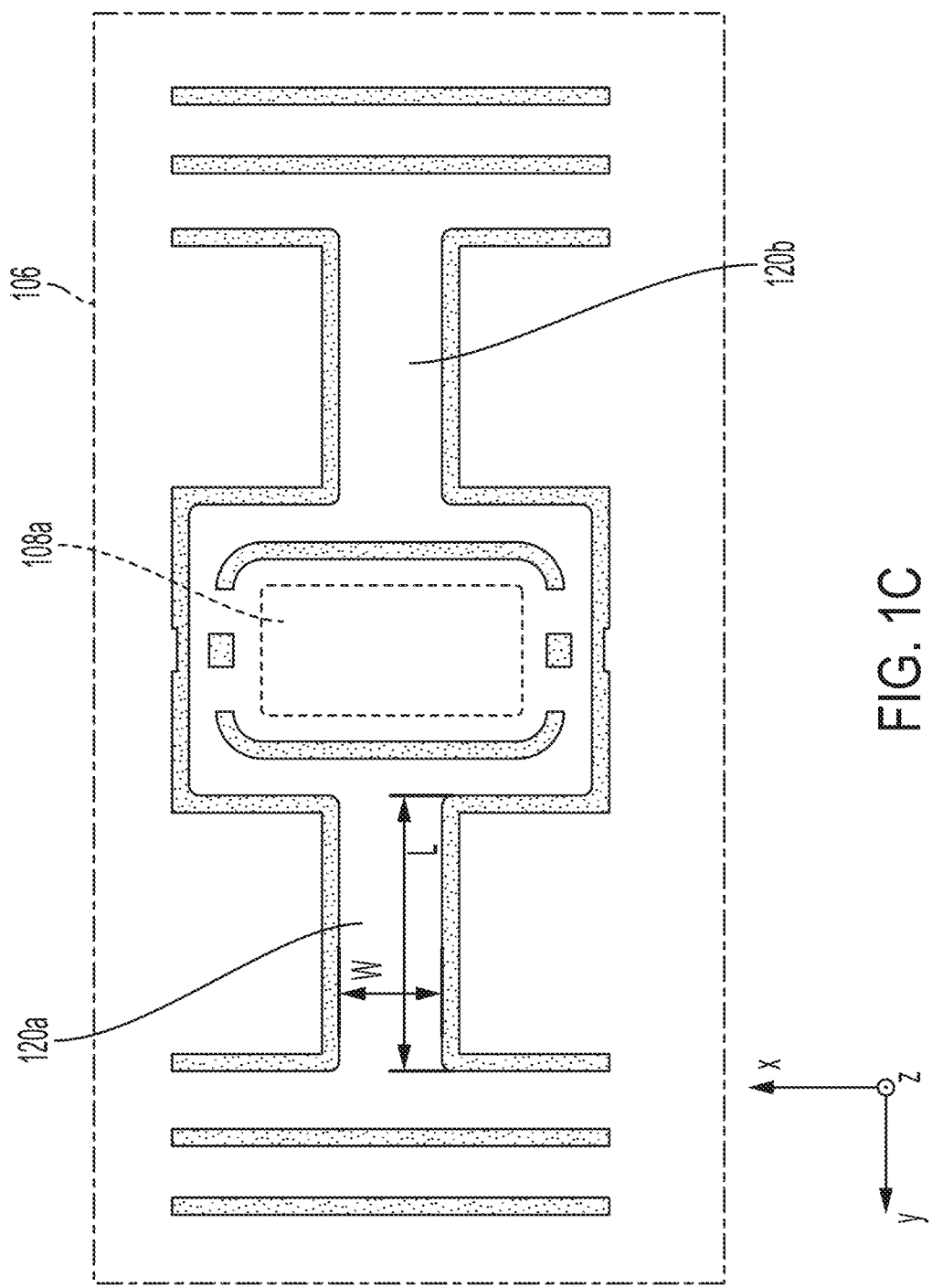
FIG. 1C is a top detail plan view of a proof mass and an anchor of the single-axis accelerometer of FIG. 1B, according to the non-limiting embodiment.

FIG. 1C shows a top detail plan view of proof mass 106 and anchor 108a of single-axis accelerometer 100, according to an exemplary embodiment. However, other anchors (for example, anchor 108b or anchors in FIG. 2 described below) and other proof mass (for example, proof masses in FIG. 2 described below) may be arranged similar to the arrangements illustrated in FIG. 1C. The illustrative embodiment of FIG. 1C additionally shows first torsional spring 120a and second torsional spring 120b. While the torsional springs are illustrated as part of single-axis accelerometer 100, other torsional springs described below (for example, in connection with single-axis accelerometer 200) may be arranged similar to the arrangements of first torsional spring 120a and second torsional spring 120b in FIG. 1C. First torsional spring 120a couples first anchor 108a to the proof mass 106. First torsional spring is arranged on a first side of the anchor 108a. Second torsional spring 120b coupled first anchor 108a to the proof mass 106. Second torsional spring 120b is arranged on a second side of the first anchor 108a. In various embodiments, torsional springs may be arranged on first and second sides of anchors. In some embodiments, the first and second sides may be different sides, or may be opposite sides of the anchor.

In some embodiments, at least three torsional springs may be coupled to a single anchor. For example, two torsional springs may be each be arranged on opposite sides of a first anchor, at total of four springs for the first anchor. A first torsional spring on a first side of the first anchor may be collinear with a second torsional spring on the second side of the first anchor while a third torsional spring on the first side of the first anchor may be collinear with a fourth torsional spring on the second side of the first anchor. This pattern of at least three torsional springs be applied to additional anchors, the corresponding springs of which may also be collinear with the springs of the first anchor. As such, there may be two sets of collinear torsional springs arranged along one set of anchors, with four springs per anchor.

Torsional springs may have various dimensions depending on the number of anchors in the accelerometer and the target operating frequency of the accelerometer. For example, an accelerometer having a target operating frequency of about 20 kHz may include two anchors each having two torsional springs. Each torsional spring may have length L in the y direction of 32 micrometers (um), a width W in the x direction of 12 um, and a thickness T in the z direction (into and/or out of the page) of 16 um. That accelerometer may have a proof mass length in the y direction of 920 um, a proof mass width in the x direction of 740 um, and a stress reliever length in the y direction of 250 um.

As another example, an accelerometer having a target operating frequency of about 30 kHz may include three anchors each having two torsional springs. Each torsional spring may have length L in the y direction of 25 um, a width W in the x direction of 15 um, and a thickness T in the z direction of 16 um. That accelerometer may have a proof mass width in the y direction of 920 um, a proof mass width in the x direction of 740 um, and a stress reliever length in the y direction of 200 um.

As yet another example, an accelerometer having a target operating frequency of about 39 kHz may include four anchors each having two torsional springs. Each torsional spring may have length L in the y direction of 17 um, a width W in the x direction of 21 um, and a thickness T in the z direction of 16 um. That accelerometer may have a proof mass width in the y direction of 920 um, a proof mass width in the x direction of 740 um, and a stress reliever length in the y direction of 160 um.

As a final example, an accelerometer having a target operating frequency of about 43 kHz may include five anchors each having two torsional springs. Each torsional spring may have length L in the y direction of 17 um, a width W in the x direction of 23 um, and a thickness T in the z direction of 16 um. That accelerometer may have a proof mass width in the y direction of 920 um, a proof mass width in the x direction of 740 um, and a stress reliever length in the y direction of 120 um.

Figure 2:
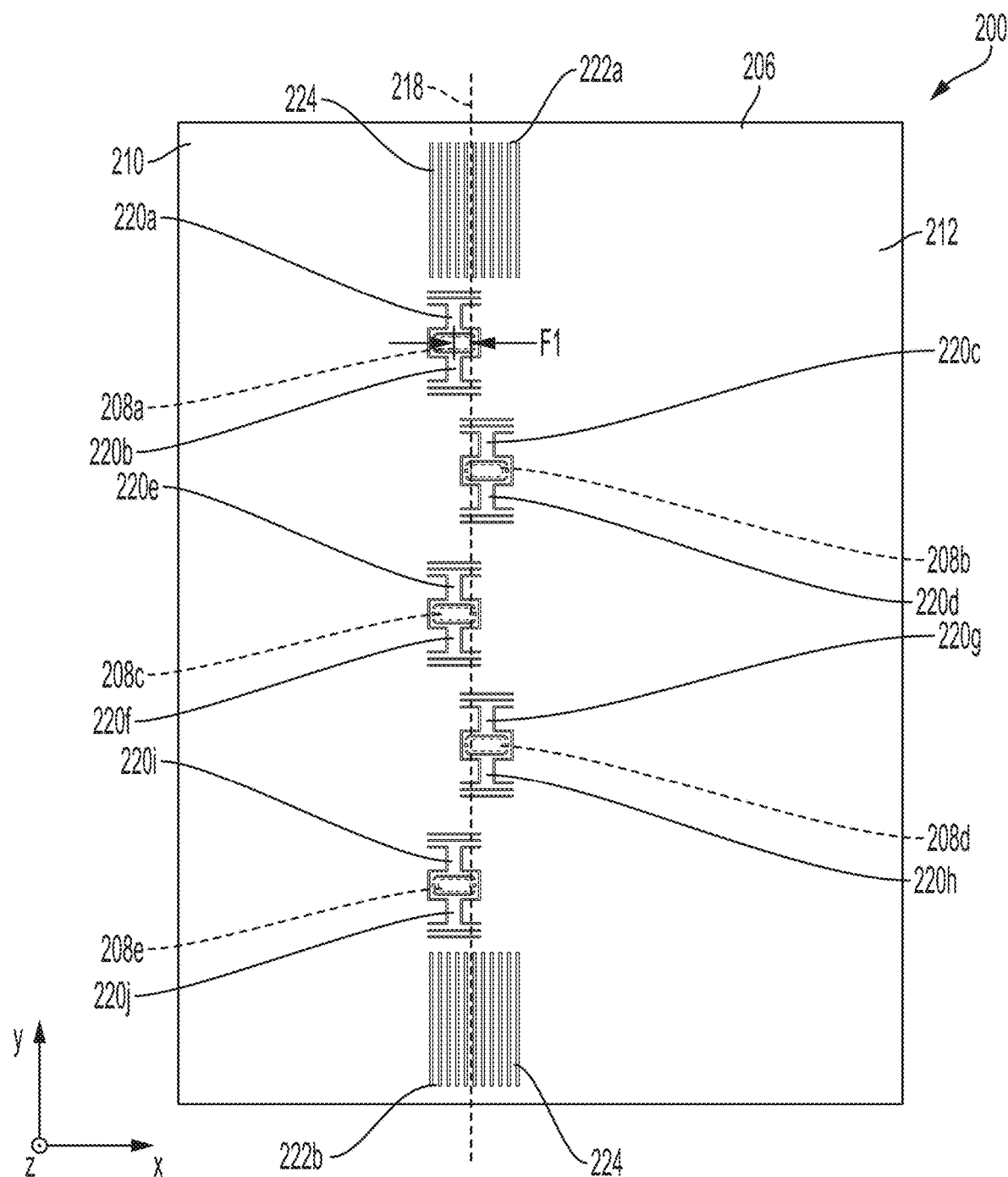
FIG. 2 is a top plan view of a single-axis accelerometer having at least two anchors, according to a non-limiting embodiment of the present application.

FIG. 2 shows a top plan view of single-axis accelerometer 200, according to an exemplary embodiment. Single-axis accelerometer 200 includes proof mass 206, first anchor 208a, second anchor 208b, third anchor 208c, fourth anchor 208d, fifth anchor 208e, first proof mass portion 210, second proof mass portion 212, first torsional spring 220a, second torsional spring 220b, third torsional spring 220c, fourth torsional spring 220d, fifth torsional spring 220e, sixth torsional spring 220f, seventh torsional spring 220g, eight torsional spring 220h, ninth torsional spring 220i, tenth torsional spring 220j, first stress-relief structure 222a, second stress-relief structure 222b, and a plurality of high aspect ratio beams 224. The proof mass 206 is configured to pivot about rotation axis 218, and may be arranged on the upper surface of a substrate (not depicted) that includes sense and/or drive electrodes (not depicted).

Proof mass 206 differs from proof mass 106 in that proof mass 206 is configured to accommodate five anchors and corresponding pairs of torsional springs rather than two anchors and corresponding pairs of torsional. Similarly, first proof mass portion 210 and second proof mass portion 212 respectively differ from first proof mass portion 110 and second proof mass portion 112 in that first proof mass portion 210 and second proof mass portion 212 are configured to accommodate five anchors and corresponding pairs of torsional springs rather than two anchors and corresponding pairs of torsional springs.

In the illustrative embodiment of FIG. 2, first anchor 208a, second anchor 208b, third anchor 208c, fourth anchor 208d, and fifth anchor 208e are arranged in a row along the rotation axis 218 of the proof mass 206. In FIG. 2, first anchor 208a, third anchor 208c, and fifth anchor 208e are arranged on one side of rotation axis 218, while second anchor 208b and fourth anchor 208d are arranged on an opposite side of the rotation axis 218. In this manner, anchors and their respective springs may be arranged alternating between sides of the rotation axis. However, arrangement of anchors is not limited in this respect, and various other patterns may be utilized. For example, a pair of consecutive anchors may be arranged on one side and another pair of consecutive anchors may be arranged on the opposite side.

A single-axis accelerometer 200 having an increased number of five anchors and corresponding torsional springs compared to the two anchors and corresponding torsional springs of singe-axis accelerometer 100 may be suitable for a higher target operating frequency than the target operating frequency of single-axis accelerometer 100.

In FIG. 2, anchors are arranged having an offset from the rotation axis 218. For example, first anchor 208a and its respective springs are arranged having an offset F1 from the rotation axis along the x direction. Because anchors are offset from each other in the x direction, the rotation axis may fall between the anchors in the x direction. In FIG. 2, the anchors are together arranged reflection symmetric across an axis bisecting the proof mass in a direction perpendicular to the rotation axis.

In the illustrative embodiment of FIG. 2, each of the anchors is coupled to the proof mass by two respective torsional springs that are arranged extending along the rotation axis. Similarly to the anchors, the torsional springs are arranged having an offset from the rotation axis 218. The first torsional spring 220a, second torsional spring 220b, fifth torsional spring 220e, sixth torsional spring 220f, ninth torsional spring 220i, and tenth torsional spring 220j are arranged on one side of the rotation axis 218 while the third torsional spring 220c, fourth torsional spring 220d, seventh torsional spring 220g, and eight torsional spring 220h are arranged on the opposite side of the rotation axis.

In the illustrative embodiment of FIG. 2, the first stress-relief structure 222a and the second stress-relief structure 222b comprise a plurality of high aspect ratio beams 224 and form a single pair of stress-relief structures extending to substantially the same distance in the x direction as the outermost anchors and torsional springs extend. First stress-relief structure 222a and second stress-relief structure 222b differ from first stress-relief structure 122a and the second stress-relief structure 122b in that they extended a lesser distance in the y direction in order to accommodate the five anchors and separately in that they extend a greater distance in the x direction to accommodate the offsets of the anchors. Similarly, high aspect ratio beams 224 differ from high aspect ratio beams 124 in that they extend a lesser distance in the y direction.

In some embodiments, a system may comprise at least two proof masses. For example, a single accelerometer may comprise at least two proof masses. Alternatively, at least two accelerometers each comprising a proof mass that are arranged on a same substrate may be included in the system. For example, such a system may include six proof masses. Each of the proof masses may be configured as described above. In some embodiments, the at least two proof masses may be configured to pivot about at least two different rotation axes. In some embodiments, the at least two different rotation axes may be arranged not parallel to each other, such as perpendicular to each other.

Figure 3:
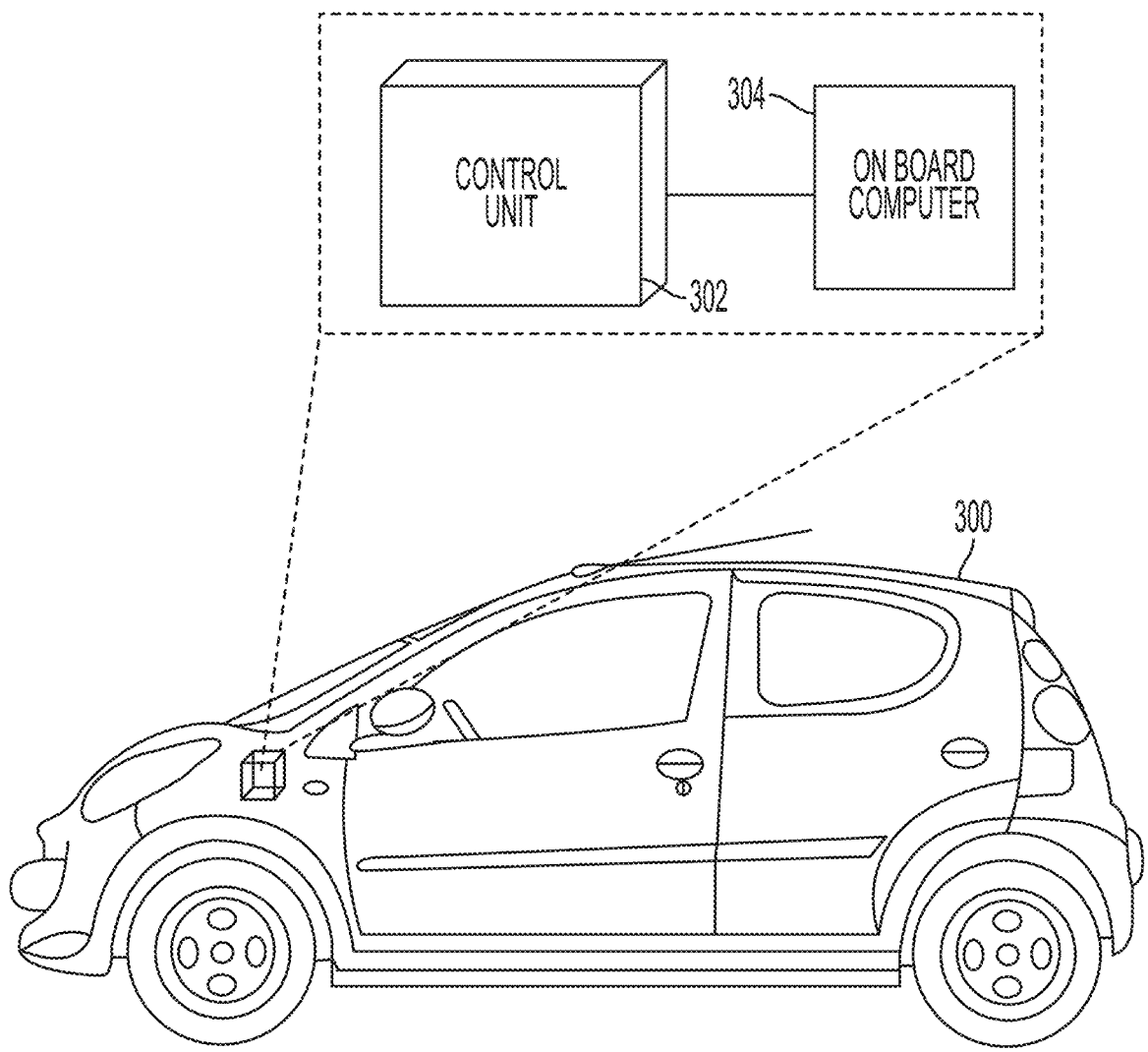
FIG. 3 illustrates an automobile which may include a single-axis accelerometer of one of the types described herein, according to a non-limiting embodiment of the present application.

FIG. 3 illustrates a non-limiting example in which at least one accelerometer of the types described herein is employed in a car. In the example of FIG. 3, an automobile 300 includes a control unit 302 coupled to an onboard computer 304 of the car by a wired or wireless connection. Control unit 302 may include at least one accelerometer of the types described herein. As a non-limiting example, the at least one accelerometer may sense accelerations in the driving direction and/or perpendicular to the driving direction. The at least one accelerometer may also be configured to sense vertical accelerations, which may be useful to monitor the status of a suspension of the automobile 300, for example. The control unit 302 may receive power and control signals from the onboard computer 304, and may supply output signals of the type described herein to the onboard computer 304.

Figure 4:
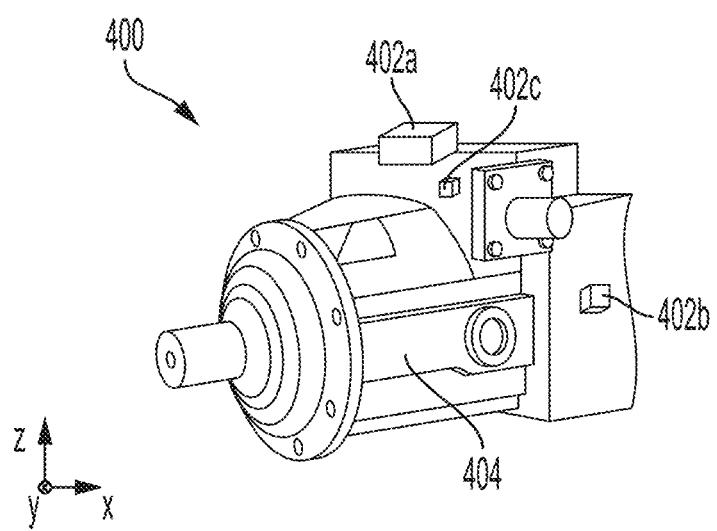
FIG. 4 illustrates a piece of industrial equipment on which are disposed three single-axis accelerometers of the types described herein, according to a non-limiting embodiment of the present application.

FIG. 4 illustrates a system 400 including three single-axis MEMS accelerometers 402a, 402b, and 402c of one or more of the types described herein coupled to a piece of industrial equipment 404. The equipment 404 may be a motor, although this is a non-limiting example. The accelerometers 402a, 402b, and 402c may be coupled to the equipment and configured to monitor vibration of the equipment with respect to a respective axis. For example, accelerometer 402a may be oriented to detect z-axis acceleration, accelerometer 402b y-axis acceleration, and accelerometer 402c x-axis acceleration. In an alternative embodiment, two or more of the accelerometers 402a, 402b, and 402c may be combined into a single package or housing, as opposed to the illustrated configuration of three distinct housings. The system may wirelessly communicate acceleration data generated by the respective accelerometer. Energy to power the accelerometer circuitry may be harvested from the vibration of the equipment 404. Other configurations are possible.

Various aspects of the present application may provide one or more benefits. Some examples are now listed. It should be appreciated that not all aspects necessarily provide all benefits, and benefits other than those listed may be provided by one or more aspects. According to some aspects of the present application, increased stiffness of single-axis teeter-totter accelerometers is provided. The increased stiffness may be particularly noticeable or beneficial at high operating frequencies. For example, teeter-totter accelerometers operating at frequencies between 2 kHz and 100 kHz but particularly frequencies above about 20 kHz (or any value within these ranges, as a non-limiting example) may exhibit increased stiffness compared to conventional designs.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The terms "approximately," "substantially," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A single-axis teeter-totter MEMS accelerometer, comprising:
   a substrate;
   a proof mass suspended above the substrate; and
   a plurality of anchors arranged in-line with each other parallel to an asymmetric rotation axis of the proof mass and coupling the proof mass to the substrate, wherein:
   each of at least two anchors of the plurality of anchors is coupled to an interior edge of the proof mass by two respective, in-line torsional springs; and
   a first end of each torsional spring of the two respective in-line torsional springs contacts the proof mass and is configured to rotate in a first direction in response to the proof mass pivoting in the first direction.

2. The single-axis teeter-totter MEMS accelerometer of claim 1, wherein the plurality of anchors comprises three anchors, and wherein each of the three anchors is coupled to the interior edge of the proof mass by two respective, in-line torsional springs.

3. The single-axis teeter-totter MEMS accelerometer of claim 1, wherein the plurality of anchors are arranged in-line on the asymmetric rotation axis of the proof mass.

4. The single-axis teeter-totter MEMS accelerometer of claim 1, wherein the plurality of anchors are arranged in-line offset from the asymmetric rotation axis.

5. The single-axis teeter-totter MEMS accelerometer of claim 1, wherein the plurality of anchors and the torsional springs are reflection symmetric across an axis that bisects the proof mass in a direction perpendicular to the asymmetric rotation axis.

6. The single-axis teeter-totter MEMS accelerometer of claim 1, wherein each of the at least two anchors of the plurality of anchors is coupled to the interior edge of the proof mass by at least three respective, in-line torsional springs.

7. A system comprising the single-axis teeter-totter MEMS accelerometer of claim 1, wherein the proof mass is a first proof mass, the system further comprising a second proof mass suspended above the substrate.

8. The system of claim 7, wherein the asymmetric rotation axis is a first rotation axis; and
the second proof mass has a second rotation axis that is perpendicular to the first rotation axis.

9. A single-axis teeter-totter MEMS accelerometer, comprising:
a substrate;
a proof mass suspended above the substrate;
a plurality of anchors coupling the proof mass to the substrate; and
at least three torsional springs coupling the plurality of anchors to the proof mass, wherein:
the plurality of anchors and the at least three torsional springs are arranged in a row along an asymmetric rotation axis of the proof mass; and
a first end of each torsional spring of the at least three torsional springs contacts the proof mass and is configured to rotate in a first direction in response to the proof mass pivoting in the first direction.

10. The single-axis teeter-totter MEMS accelerometer of claim 9, wherein the plurality of anchors comprises three anchors and the at least three in-line torsional springs comprises six in-line torsional springs.

11. The single-axis teeter-totter MEMS accelerometer of claim 9, wherein the plurality of anchors are arranged in-line on the asymmetric rotation axis of the proof mass.

12. The single-axis teeter-totter MEMS accelerometer of claim 9, further comprising a stress-relief structure on the asymmetric rotation axis arranged between a first anchor of the plurality of anchors and the perimeter of the proof mass.

13. The single-axis teeter-totter MEMS accelerometer of claim 9, further comprising a first stress-relief structure and a second stress-relief structure;
wherein each anchor of the plurality of anchors is arranged between the first stress-relief structure and the second stress-relief structure.

14. A single-axis teeter-totter MEMS accelerometer, comprising:
a substrate;
a proof mass suspended above the substrate;
a plurality of anchors arranged along an asymmetric rotation axis of the proof mass, disposed within a perimeter of the proof mass, and coupling the proof mass to the substrate, the plurality of anchors comprising a first anchor and a second anchor;
a first torsional spring extending along the asymmetric rotation axis and coupling the proof mass to the first anchor, the first torsional spring being arranged on a first side of the first anchor;
a second torsional spring extending along the asymmetric rotation axis and coupling the proof mass to the first anchor, the second torsional spring being arranged on a second side of the first anchor different than the first side of the first anchor;
a third torsional spring extending along the asymmetric rotation axis and coupling the proof mass to the second anchor, the third torsional spring being arranged on a first side of the second anchor;
a fourth torsional spring extending along the asymmetric rotation axis and coupling the proof mass to the second anchor, the fourth torsional spring being arranged on a second side of the second anchor different than the first side of the second anchor,
wherein a first end of each torsional spring of the first torsional spring, the second torsional spring, the third torsional spring, and the fourth torsional spring contacts the proof mass and is configured to rotate in a first direction in response to the proof mass pivoting in the first direction.

15. The single-axis teeter-totter MEMS accelerometer of claim 14, wherein at least one anchor of the plurality of anchors is offset from the asymmetric rotation axis of the proof mass in a direction perpendicular to the asymmetric rotation axis.

16. The single-axis teeter-totter MEMS accelerometer of claim 14, wherein the plurality of anchors are embedded in the proof mass.

17. The single-axis teeter-totter MEMS accelerometer of claim 14, wherein the plurality of anchors are arranged in-line with each other parallel to the asymmetric rotation axis of the proof mass.

18. The single-axis teeter-totter MEMS accelerometer of claim 14, wherein the plurality of anchors are arranged in-line with each other on the asymmetric rotation axis of the proof mass.

19. A system comprising the single-axis teeter-totter MEMS accelerometer of claim 14, wherein the proof mass is a first proof mass, the system further comprising a second proof mass suspended above the substrate.

20. The system of claim 19, wherein the asymmetric rotation axis is a first rotation axis; and
the second proof mass has a second rotation axis that is not parallel to the first rotation axis.

* * * * *